United States Patent [19]

Moir

[11] Patent Number: 5,242,522
[45] Date of Patent: Sep. 7, 1993

[54] PHOTO ALBUM PAGE
[75] Inventor: Matthew Moir, Coram, N.Y.
[73] Assignee: Enbee Plastics, Inc., Long Island City, N.Y.
[21] Appl. No.: 980,243
[22] Filed: Nov. 23, 1992
[51] Int. Cl.[5] ............................................. B29C 47/06
[52] U.S. Cl. .............................. 156/243; 156/244.11; 156/244.19; 156/250; 156/290; 156/291
[58] Field of Search ............... 156/243, 244.11, 244.12, 156/244.18, 244.19, 290, 291, 325, 327, 250; 40/159

[56] References Cited

U.S. PATENT DOCUMENTS

| | | | |
|---|---|---|---|
| 3,008,862 | 11/1961 | Haine et al. | 156/308.4 |
| 4,452,666 | 6/1984 | Dorman | 156/244.11 |
| 4,471,545 | 9/1984 | Dorman | 40/159 |
| 4,702,026 | 10/1987 | Shaine | 156/243 |
| 4,977,694 | 12/1990 | Dorman | 40/159 |

Primary Examiner—Caleb Weston
Attorney, Agent, or Firm—Michael Ebert

[57] ABSTRACT

A method for producing a photo album page composed of superposed panels of transparent polypropylene film joined together by parallel lines of adhesive to define channels, each of which is divided by a paper strip into front and rear compartments to accommodate photos. To make photo album pages of this type, two webs of polypropylene film are concurrently advanced into combining rolls. Applied to the inner surface of one of the polypropylene webs are parallel lines of hot-melt adhesive whose chemistry is such that it has an affinity for polypropylene. When the webs are adhered together in the combining rolls, the lines create a plurality of channels. Also concurrently fed into the combining rolls in the spaces between the lines are a like plurality of paper tapes, whereby emerging from the rolls is a composite web which is then slit into individual album pages.

7 Claims, 1 Drawing Sheet

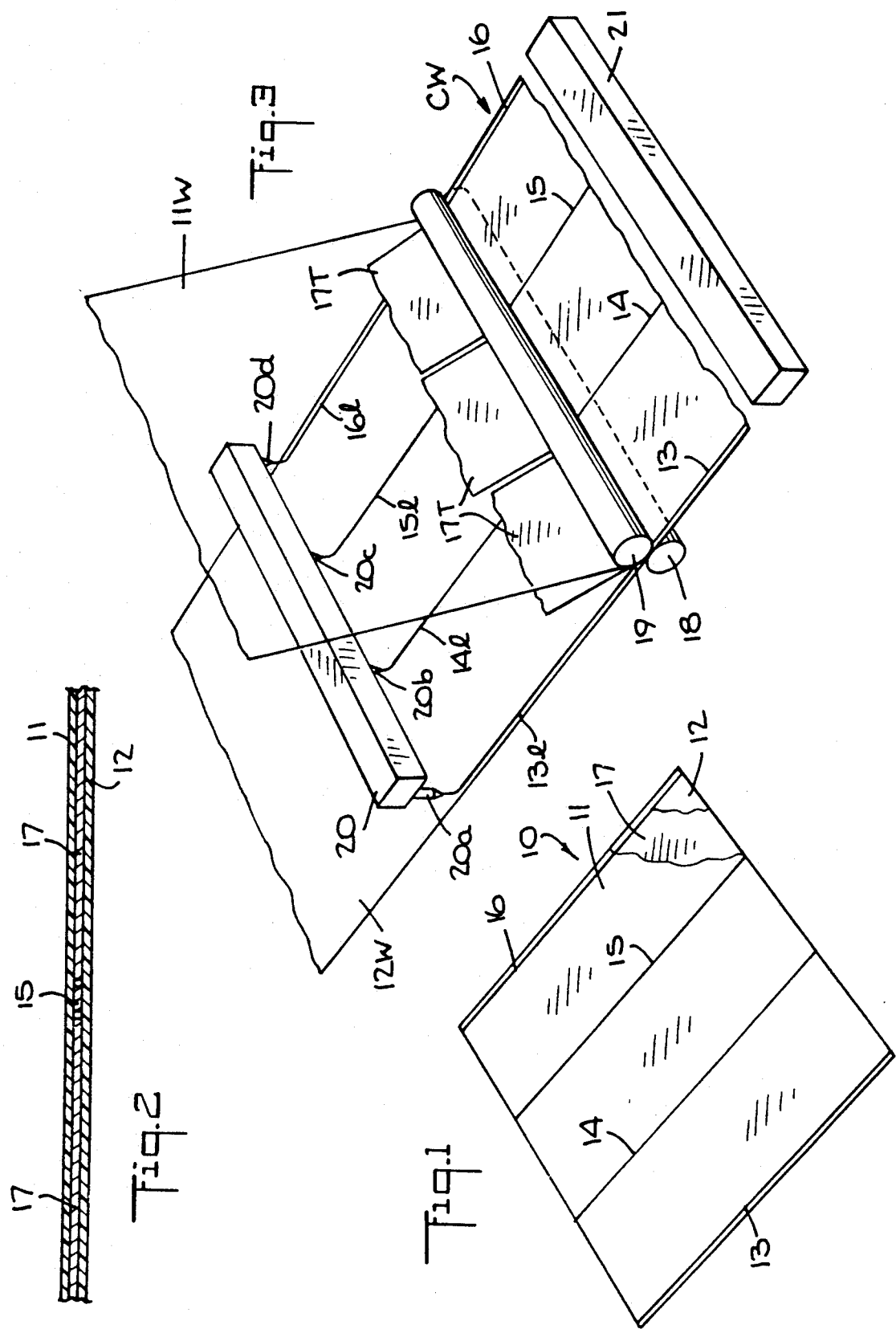

PHOTO ALBUM PAGE

BACKGROUND OF INVENTION

1. Field of Invention

This invention relates generally to methods for producing album pages for mounting photographs, and more particularly to a method to form an album page composed of two superposed panels of biaxially oriented, transparent polypropylene film joined together by parallel lines of hot melt adhesive to define channels, each of which is divided by a paper strip into front and rear compartments to accommodate photos.

2. Status of The Prior Art

The patents to Dorman, U.S. Pat. Nos. 4,452,666 and 4,471,545, disclose multi-channel jackets for accommodating microfilm strips, the jackets being formed by superposed panels of transparent Mylar polyester film which are joined together by parallel ribs of adhesive material to define channels for receiving the microfilm strips.

In the Shaine U.S. Pat. No. 4,702,026, there is disclosed a transparent jacket adapted to accommodate photos, such that the jacket functions as a photo album page. This album page is formed of superposed panels of biaxially-oriented polypropylene film which are joined together by parallel lines of pressure-sensitive adhesive.

It is noted in the Shaine patent that previously known photo album pages were formed by panels of polyvinyl chloride (PVC) permanently joined together by lines of hot-melt adhesive. However, while biaxially oriented polypropylene film has a greater clarity than PVC film and is also less expensive, it was not possible, according to Shaine, to effectively join together polypropylene panels with a hot-melt adhesive; hence one could not, prior to Shaine, exploit the advantages of polypropylene film in the context of a photo album page. In order, therefore, to create a photo album page whose panels are of polypropylene film material, Shaine uses parallel lines of pressure-sensitive adhesive to join together these panels to create channels or compartments to receive the photos.

Since the distinction that exists between a pressure-sensitive adhesive and a hot-melt adhesive is important to the present invention, this distinction must be clearly understood.

By definition, a pressure-sensitive adhesive is one that adheres or seals under the influence of pressure alone. Thus in order to get Scotch tape, a well-known brand of pressure-sensitive adhesive tape, to adhere to paper, one has only to press the tape against the paper.

A hot-melt adhesive is made of a synthetic resin which is applied in a hot molten state. Hence when two sheets are joined together by a hot-melt adhesive applied to the surfaces to be joined, it is only when this adhesive cools and hardens that a permanent bond is then created between the two sheets. If one were to thereafter peel apart the two sheets to disrupt this bond, the bond could not be restored by then pressing the two sheets together. But when a pressure-sensitive adhesive is used to join two sheets together, one can thereafter peel apart the two sheets to break the bond and then restore this bond by again pressing the two sheets together.

In the method disclosed in the Shaine patent to produce a photo album page, two webs of polypropylene film are advanced concurrently into combining rolls. Applied to the inner surface of one of these webs before it enters the combining rolls are parallel lines of pressure-sensitive adhesive in a hot, molten state. This adhesive is then rapidly cooled below its melting point so that before it enters the combining rolls where it is subjected to pressure, the adhesive is then in a solid, highly tacky state and will bring about adherence of the two polypropylene webs.

The pressure-sensitive adhesive lines in the Shaine album page define channels or compartments into which one may insert photographs or slides. In the context of a photo album page, this gives rise to two disadvantages. When in the combining rolls, the lines of pressure-sensitive adhesive are squeezed to define channels which are bordered by these lines, the squeezed lines have sticky edges or margins. Because of this, it may be difficult to insert photos into the channels having a width closely matching that of the channels, for the sticky edges of the channel borders resist insertion of the photos.

Another disadvantage is that a pressure-sensitive adhesive produces a relatively weak bond as compared to the permanent bond resulting from the use of a hot-melt adhesive. This weak bond tends to become still weaker with age. Hence an album page of the Shaine type may in time delaminate.

A factor which plays an important role in the acceptability of a photo album page or a jacket for storing microfilm strips is its archival quality; that is, the ability of the jacket or page to retain its integrity and not fall apart after a few years.

Transparent polypropylene film which is biaxially oriented is the preferred material for album pages, not only because of its great strength and high degree of clarity, but also because of its relatively low cost as compared to Mylar (polyester) and other films having similar characteristics. One must therefore take into account the archival quality of polypropylene, and in this regard the chemistry of this material must be considered.

Polypropylene is a synthetic, crystalline, thermoplastic polymer with a molecular weight of 40,000 or more. While it is not attacked by fungi or bacteria, and is resistant to most acids, it is attacked and degraded by those acids which act as oxidizing agents. If, therefore, polypropylene film panels are joined together by a pressure-sensitive or hot-melt adhesive agent which contains an acid that attacks the film, its archival quality will be impaired.

It is to be noted that polypropylene falls into a class of thermoplastic polymers derived from simple olefins known as polyolefins. This class also includes polyethylene and polybutenes.

SUMMARY OF INVENTION

In view of the foregoing, the main object of this invention is to provide a method for producing a photo album page composed of superposed panels of transparent polypropylene film permanently bonded together by parallel lines of a hot-melt adhesive to define channels for receiving photos.

More particularly, an object of this invention is to provide a method of the above type in which the hot-melt adhesive has a chemical affinity for the polypropylene and is acid free whereby the resultant album page has a high degree of clarity so that photos mounted therein are clearly visible, and the album page is of archival quality and has an indefinite life.

Also an object of this invention is to provide a method for mass-producing low-cost photo album pages of the above type at a relatively high production rate.

Briefly stated, these objects are attained in a method for producing photo album pages in which two webs of biaxially oriented transparent polypropylene film are concurrently advanced into combining rolls. Applied to the inner surface of one of the webs before it enters the rolls are parallel lines of hot-melt adhesive constituted by an amorphous polyolefin, free of acidity and having an affinity for polypropylene.

These lines of hot-melt adhesive, when the webs are brought together in the combining rolls, create a plurality of channels. Also concurrently advanced into the combining rolls in the spaces between the lines are a like plurality of paper tapes, whereby emerging from the rolls is a composite web. This composite web is then transversely cut at spaced positions to produce individual album pages in which each channel is divided by a strip of paper into front and rear compartments to accommodate photos inserted therein.

BRIEF DESCRIPTION OF THE DRAWING

For a better understanding of the invention as well as other objects and further features thereof, reference is made to the following detailed description to be read in conjunction with the accompanying drawings, wherein:

FIG. 1 illustrates, in perspective, a photo album page produced by a method in accordance with the invention, the top panel being cut away to expose the paper strip in one of the channels which divides the channel into front and rear compartments, the paper strip being cut away to expose the underlying rear panel;

FIG. 2 is a transverse section taken through two adjacent channels of the photo album page; and FIG. 3 schematically illustrates a manufacturing system for mass producing the photo album pages.

DESCRIPTION OF INVENTION

Referring now to FIGS. 1 and 2, there is shown a photo album page 10 which is made by a method in accordance with the invention. Page 10 comprises superposed front and rear panels 11 and 12 made of biaxially-oriented, transparent polyethylene film of high clarity. In practice, each panel preferably has a thickness of about two mils.

These panels are permanently joined together by parallel equi-spaced lines of hot-melt adhesive 13, 14, 15 and 16. Lines 13 and 16 are respectively adjacent the lower and upper sides of the page, while lines 14 and 15 are at intermediate positions to define three like channels having the same dimensions and extending the full length of the page. It is to be understood that the invention is not limited to an album page having three channels, for in practice, the page may have a greater or smaller number of channels.

Each channel is divided by a paper strip, such as the paper strip 17 disposed in the uppermost channel, into front and rear compartments in which are insertable photos to be displayed.

The dimensions of the page and the channels formed therein depend on those of the photos to be mounted. Thus if the photos are of the standard size produced by Polaroid instant cameras, and it is desired that each channel have a capacity to accommodate three such photos in side-by-side relation, then the dimensions of the channels of the album page must be such as to snugly accommodate these photos.

It is to be noted that in FIG. 2, no spaces exist between the upper and lower film panels 11 and 12 and the paper strip 17 sandwiched therebetween. However, the thin polypropylene film panels are highly flexible, and it is therefore not at all difficult to slip a photo between either side of paper strip 17 in a channel and the related film panel.

Polypropylene is a polyolefin material, and in order for the panels to be securely and permanently bonded together by adhesive lines 13 to 16, it is essential that the hot melt adhesive used for this purpose have a chemical affinity for polypropylene. And it is also essential, in order to impart archival quality to the album page, that the adhesive be acid free so that it will not react with and degrade the polypropylene film.

We have discovered that a hot melt adhesive which satisfies these requirements is an adhesive constituted by an amorphous polyolefin material free of acidity, such as the Eastobond A-757S adhesive marketed by the Eastman Kodak Company. When this adhesive is applied in the hot molten state to one web of polypropylene film material which has a crystalline polyolefin structure, and this web is brought into contact with another web of the same film material, then once the adhesive cools to below its melting point and hardens, a permanent, high-strength bond is formed. As a consequence, each adhesive line whose chemistry is similar to that of the polypropylene panels forms a thin rib that is integrated with the panels.

The method by which this photo album page is created is illustrated in FIG. 3, where it will be seen that a system for producing the photo album pages includes a web combining station constituted by a pair of combining rolls 18 and 19, one above the other and having a space therebetween to form a nip whose dimension is appropriate to the webs and paper tapes fed therein.

Drawn from a supply reel is a web 12W of polypropylene film material for forming bottom panel 12 of the album page. Drawn from another supply roll is a web 11W of polypropylene film material for forming top panel 11 of the album page. Webs 11W and 12W are concurrently advanced into the nip of combining rolls 18 and 19 at a speed of at least 100 feet per minute or at any other suitable high production speed. To this end, the combining rolls are motor driven, or other driven rolls can be provided in the system to pull the webs from their supply reels through the combining rolls at the combining station.

The system includes an extruder station 20 having four equi-spaced extruder nozzles 20a, 20b, 20c and 20d which are so placed relative to the inner surface of the lower web 12W so as to lay down thereon in the hot molten state four parallel lines of hot-melt adhesive 13L, 14L, 15L and 16L to create the adhesive lines 13 to 16 defining the channels of the album page. The adhesive used is of the amorphous, polyolefin type previously described.

The extruder station 20 is placed upstream of combining rolls 18 and 19, and the distance between this station and the combining station and the speed at which the webs are fed into the combining station are such that the adhesive is still in a hot molten state when the upper and lower webs are brought into contact with each other in the combining rolls. But as soon as the combined webs emerge from the combining rolls, cooling takes place to bring the adhesive below its melting point and to cause it to harden to produce a permanent bond.

Also concurrently fed into the combining rolls at the same speed as the webs are three identical paper tapes 17T drawn from respective supply reels. The three tapes are in side-by-side relation and their width is such that each tape lies within adjacent adhesive lines. Thus one paper tape 17T is placed between adhesives lines 13L and 14L, the second between adhesive lines 14L and 15L, and the third between lines 15L and 16L.

Hence emerging from combining rolls 18 and 19 is a composite web CW formed by paper tapes 17T sandwiched between plastic film webs 11W and 12W. The composite web CW is fed into a periodically actuated slitter station 21 which acts at timed intervals to slice composite web CW into individual photo album pages 10.

Alternatively, the composite web CW may be wound onto a pickup reel, and then in a separate operation, the composite web may be pulled off this reel and fed into a punching station in which loose-leaf punch holes are punched into each channel, the web then going into a slitter station to produce individual album pages, each having punch holes. Thus the resultant pages can be held in a loose-leaf album. Or punching may take place after individual pages are produced.

While there has been shown and described a preferred embodiment of a photo album page in accordance with the invention, it will be appreciated that many changes and modifications may be made therein without, however, departing from the essential spirit thereof.

I claim:
1. A method to produce photo album pages comprising the steps of:
   (a) concurrently advancing two webs of polypropylene film material into combining rolls;
   (b) applying to an inner surface of one of said webs parallel lines of a hot melt adhesive in the hot molten state having a chemical affinity for polypropylene, the webs being advanced at a rate whereby the adhesive is molten when the webs enter the rolls and then rapidly cools and hardens to produce a permanent bond, the bond lines then defining a plurality of like channels; and
   (c) transversely slitting the combined webs emerging from the rolls into individual album pages.

2. A method as set forth in claim 1, in which the adhesive is an amorphous polyolefin, free of acidity.

3. A method as set forth in claim 1, wherein said polypropylene is biaxially oriented.

4. A method as set forth in claim 1, wherein said webs are advanced at a rate of at least 100 feet per minute.

5. A method as set forth in claim 1, wherein said webs have a thickness not in excess of 2 mils.

6. A method as set forth in claim 1, further including the step of concurrently advancing into the combining rolls a like plurality of paper tapes so that they lie between the lines of adhesive and in the album page form paper strips in each channel which divide the channel into front and rear compartments to accommodate photos.

7. A method as set forth in claim 1, wherein there are at least three channels.

* * * * *